Nov. 7, 1961 M. E. IHNAT 3,007,990
THERMOCOUPLE
Filed March 29, 1960
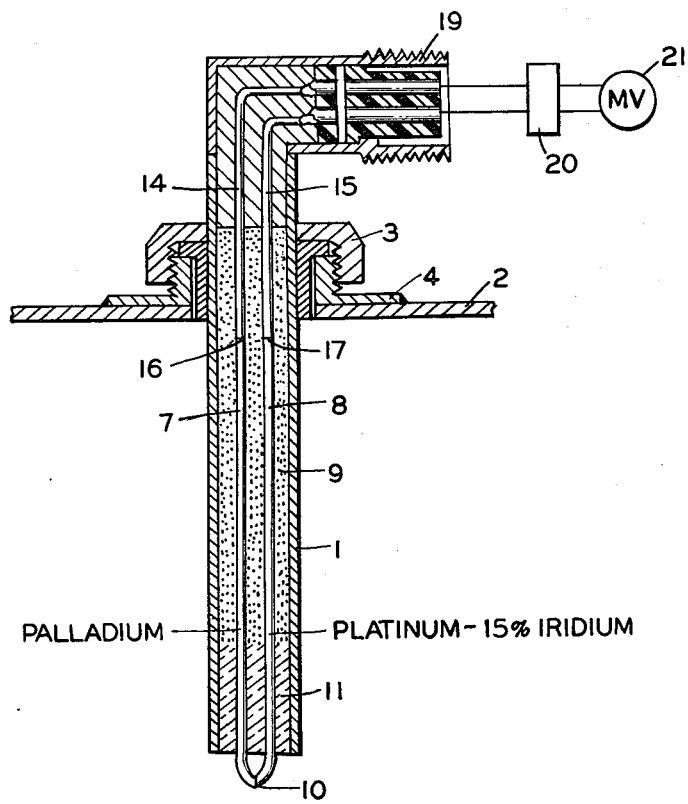
INVENTOR.
MICHAEL E. IHNAT
BY
Irving M. Freedman
HIS ATTORNEY 3,007,990
THERMOCOUPLE
Michael E. Ihnat, South Lynnfield, Mass., assignor to General Electric Company, a corporation of New York
Filed Mar. 29, 1960, Ser. No. 18,312
4 Claims. (Cl. 136—5)

This invention relates to thermocouples and more particularly to improved thermoelements enabling operation at elevated temperatures under adverse conditions.

Thermocouples are commonly utilized in gas turbine engines to sense the temperature of the gas in order to control the fuel flow to the engine and perform other control functions to prevent engine temperatures from exceeding certain critical values which may damage or destroy the engine.

The gas temperature of such engines may often be relatively high, 2000° Fahrenheit or over, and the atmosphere may be oxidizing. Thermocouples operating under such conditions should be sensitive to temperature changes, that is, provide as large a change of output voltage as possible for a given change of temperature to which the thermocouple junction is exposed, while at the same time providing a relatively stable output versus temperature characteristic for extended periods of operation. Furthermore, such thermocouples should provide a large output voltage for a given temperature, should be relatively inexpensive, should not be volatile at high temperatures, and should be rugged, non-brittle, and shock resistant.

Prior art devices have proved inadequate under certain operating conditions, particularly high temperatures, in providing all of the desirable characteristics listed above.

Accordingly, it is an important object of the present invention to provide an improved thermocouple suitable for operation at elevated temperatures in an oxidizing atmosphere.

Another object of the invention is to provide an improved thermocouple which provides a stable, yet relatively large, voltage output versus temperature characteristic over extended periods of use and operation at high temperatures.

Still another object of the invention is to provide an improved noble metal thermocouple which is relatively inexpensive and suitable for operation under adverse conditions of turbulence, shock, or an oxidizing atmosphere.

Yet another object of the invention is to provide an improved palladium/platinum iridium thermocouple suitable for operation at temperatures in the range of 2000° F. to 2300° F.

Other objects of the invention will become apparent as the following description proceeds and the features of novelty which characterize the invention will be pointed out with particularity in the claims annexed to and forming a part of this specification.

In accordance with one form of the invention, a sheathed thermocouple is provided having a pair of thermocouple leads or thermoelements constructed of palladium and platinum containing approximately 15 percent iridium respectively.

For a better understanding of this invention, reference may be had to the following description taken in connection with the accompanying drawing which shows a thermocouple unit embodying the invention.

Referring to the sole figure, the thermocouple assembly includes a nickel alloy cylindrical housing or sheath 1 which is adapted to be mounted through an aperture in a housing wall 2 of a gas turbine power plant or other chamber confining a liquid or gas flow which is to be measured through a threaded nut 3 associated with the sheath or through other suitable fastening means which co-operate with threaded flange 4 welded or brazed to the housing wall.

Extending through the base of the sheath 1 are a pair of thermocouple conductors or thermoelements 7 and 8 of dissimilar metals which are insulated from each other and from the sheath 1 by an insulating material 9 such as powdered MgO, MgO and glass, or $Al_2O_3$.

The thermoelements 7 and 8 extend beyond the bottom of the housing 1 and are welded to form a thermocouple junction 10. In order to prevent the powdered core material from flaking off or decomposing at the junction end of the housing 1, a confining means such as core plug 11 may be utilized to seal the junction end. The insulating powder and core plug may be fabricated in a manner more fully described in United States Patent 2,587,391, entitled "Thermocouple," filed June 10, 1949, by John D. Seaver, issued February 26, 1952, and assigned to the same assignee as the present invention.

The thermoelements 7 and 8 are welded or brazed to lead wires 14 and 15 at junctions 16 and 17 respectively and extend through the insulating material 9 to a connector 19 which, in turn, is electrically connected in circuit with a reference junction 20 to an indicating and/or control system shown in the drawing as millivoltmeter 21. The details of the lead wires, connector, and reference junction form no part of this invention and a more complete description thereof may be had by reference to copending application Ser. No. 18,285, filed by Donald Jaffe and Marion C. Hallinan on March 29, 1960, entitled "Thermocouple System" and assigned to the same assignee as the present invention.

In accordance with the subject invention, the thermoelements 7 and 8 are constructed of the following material in order to provide the benefits set forth above.

Thermoelement 7 is fabricated of 16 gauge palladium of a grade known in the art as chemically pure. Palladium is a noble metal which is relatively inexpensive as compared to a noble metal such as platinum and provides a relatively high negative E.M.F. with respect to platinum.

The thermoelement 8 is fabricated of 16 gauge platinum containing 14 percent to 16 percent of iridium by weight and of a grade in accordance with Instrument Society of America standards. The purity of the component metals of thermoelements 7 and 8 should preferably be a minimum of 99.99 percent or even better for best results.

It has been found that the percentage of iridium affects the thermocouple characteristics with 15 percent being desirable. Greater amounts do not increase the thermocouple voltage output while tending to provide a brittle thermocouple which may break or be damaged under the shock and vibration of gas turbine operation or while being handled or during maintenance of the engine. Lesser amounts of iridium tend to decrease the voltage output of the thermocouple at temperatures to which the junction 10 is subjected.

Accordingly, it has been found that 14 percent to 16 percent by weight of iridium for lead 8 provides optimum thermocouple sensitivity without any unduly brittle thermoelement.

Thermocouples constructed as described above have provided reliable and stable operation at temperatures 2000° F. over extended periods of 600 or more hours of operation under adverse conditions. The thermocouples are relatively inexpensive and provide thermoelectric characteristics such as shown in the following table:

[Reference junction 20 at 32° F.]

| Temperature, ° F.: | E.M.F. output, millivolts |
|---|---|
| 250 | 2.29 |
| 500 | 5.38 |
| 750 | 8.94 |
| 1000 | 12.94 |
| 1250 | 17.39 |
| 1500 | 22.25 |
| 2000 | 33.12 |

Therefore, while a particular embodiment of the subject invention has been shown and described herein, it is in the nature of description rather than limitation, and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. A thermocouple for measuring fluid temperature comprising: a first and a second thermoelectric element supported in spaced relationship, and a thermocouple junction formed by the ends thereof, said first element being palladium, and said second element being platinum containing approximately 15 percent by weight of iridium.

2. A thermocouple for measuring fluid temperature comprising: a first and a second thermoelectric element supported in spaced relationship, and a thermocouple junction formed by the ends thereof, said first element being palladium, and said second element being platinum containing 14 percent to 16 percent by weight of iridium.

3. A thermocouple for measuring fluid temperature comprising: a first and a second thermoelectric element supported in spaced relationship, and a thermocouple junction formed by the ends thereof, said first element being chemically pure palladium, and said second element being platinum containing 14 percent to 16 percent by weight of iridium.

4. A sheathed high temperature thermocouple for measuring fluid temperature comprising: a first and a second thermoelectric element supported in spaced relationship within a metallic sheath, insulating material between said elements and the interior of said sheath, and a thermocouple junction formed by the ends thereof, said first element being 16 gauge palladium, and said second element being 16 gauge platinum containing approximately 15 percent iridium.

References Cited in the file of this patent

UNITED STATES PATENTS

| 1,055,119 | Zimmerman | Mar. 4, 1913 |
| 1,515,464 | Dietz | Nov. 11, 1924 |
| 2,012,465 | Godecke | Aug. 27, 1935 |
| 2,335,707 | Streicher | Nov. 30, 1943 |
| 2,406,172 | Smithells | Aug. 20, 1946 |

FOREIGN PATENTS

| 407,658 | Great Britain | June 5, 1933 |